United States Patent [19]

Kiss

[11] Patent Number: 4,828,913

[45] Date of Patent: May 9, 1989

[54] PROCESS FOR THE MANUFACTURE OF MOLDED PARTS FROM FIBROUS MATERIAL AND FIBER MATTING FOR THE MANUFACTURE OF MOLDED PARTS

[76] Inventor: Gunter H. Kiss, Willdenow-Strasse 20, D. 1000 Berlin 45, Fed. Rep. of Germany

[21] Appl. No.: 718,953

[22] Filed: Apr. 2, 1985

[30] Foreign Application Priority Data

Apr. 2, 1984 [DE] Fed. Rep. of Germany ....... 3412660

[51] Int. Cl.$^{4}$ .......................... B32B 5/02; B32B 5/20; C08J 5/24; C08J 9/40

[52] U.S. Cl. .................................... 428/283; 264/45.3; 264/54; 264/257; 264/DIG. 18; 428/317.9; 521/53; 521/54

[58] Field of Search ................ 264/45.3, 54, DIG. 18, 264/257; 428/283, 317.9; 521/53, 54

[56] References Cited

U.S. PATENT DOCUMENTS 3,671,377 6/1972 Marra ............................ 264/45.3 X 3,764,428 10/1973 Oshima et al. .................... 264/54 X

OTHER PUBLICATIONS

*Whittington's Dictionary of Plastics,* by Lloyd R. Whittington, Stamford, Conn., Technomic, ©1968, Preface; p. 9.

*Dictionary of Plastics,* by J. A. Wordingham and P. Reboul Feltham, Middlesex, England, New NBS Books–Publ. by the Hamlyn Publishing Group, Ltd., ©1968, p. 9.

*Hackh's Chemical Dictionary,* Fourth Edition, Completely Revised and Edited by Julius Grant, New York, McGraw-Hill, ©1972, pp. 28–29.

*Primary Examiner*—Philip Anderson

*Attorney, Agent, or Firm*—Basile and Hanlon

[57] ABSTRACT

A process for the manufacture of molded parts from fibrous material, particularly cellulose-containing fibers. A particulate binder is incorporated into a fiber filling after which the mixture is precompacted into a fiber mat which is subjected to a hot steam treatment and is finally molded into the finished part under pressure and heat. The binder consists of thermoplastic particles into which a blowing agent is incorporated by forming an alloy-like state which is activated prior to final molding of the part, preferably by means of hot steam treatment, and a binder which cross-links when exposed to heat applied to the surface of the particles.

17 Claims, 1 Drawing Sheet

PROCESS FOR THE MANUFACTURE OF MOLDED PARTS FROM FIBROUS MATERIAL AND FIBER MATTING FOR THE MANUFACTURE OF MOLDED PARTS

BACKGROUND OF THE INVENTION

The invention pertains to a process for the manufacture of molded parts of fibrous material. More specifically, this invention pertains to a process in which fibrous material together with a thermoplastic binder, at least one binder which cross-links when exposed to heat, and a blowing agent are precompacted into a matting and which is subsequently subjected to a hot steam treatment before it is pressed into a molded part by being exposed to pressure and heat possibly after undergoing a performing process, and a fiber matting for the manufacture of molded parts in accordance with this process.

Such molded parts are made of cellulose-containing fibers which initially form a loosely compacted matting together with the binder comprising 10%-30% of the total volume before this material is pressed in the final molded part.

The binders, generally, are thermoplastic binders, such as natural resins, and binders which cross-link when exposed to heat, such as thermosetting plastics or elastomers, a combination of these two binder types generally being chosen.

Other natural or synthetic fibers may also be added to the cellulose or lignocellulose fibers.

Such matting is produced either by scattering the powdered binders together with the fibers onto an appropriate conveyor belt or by adding liquified binders in the form of liquid solutions or emulsions to the fibers and distributing them by way of a wiping action. In both cases, the scattered fiber mixture is loosely compacted to a random fiber, fleece matting by calendering rollers, thereby facilitating easy handling and transport.

In accordance with German Published Application No. 31 27 846, a foam-blowing agent can be added to the binders to reduce the density of the finished molded part without impairing its strength or stability. This is accomplished by thoroughly premixing the powdered blowing agent with the powdered binders after which this powdered mixture is scattered between the fibers while the fiber matting is formed or molded. The decomposition temperature of the blowing agent is chosen in such a manner that reaction is achieved only during the final hot pressing of the fiber matting into the final molded part (forming or molding temperature approximately 180° C., decomposition temperature approximately 165° C.).

Molded parts of the above-described type are manufactured in two stages particularly when a complicated form must be achieved.

First, the precompacted matting consisting of the fibers and the binders is thermally opened, as a rule, by means of a hot steam treatment. In this state, the precompacted matting is more ductile or formable. At this point, the material is shaped into its approximate final form in a preforming process using cold equipment. This preformed part derives its stability primarily from the thermoplastic binder contained in the matting. It is subsequently inserted into a hot press or mold (approximately 180° C.) and is finally compacted and formed by applying pressure. The binder which cross-links when exposed to heat cures in the hot equipment and thus imparts to the resultant finished part its stability.

In German Published Application No. 31 27 846 the effect of the blowing agent in the mixture of powdered binders is described in such a manner that the gas separates, that is, that the expanding process takes place only during the continued processing of the matting into the molded part; namely, during the actual final pressing which takes place at temperatures above 180° C. Because of this action, the softened binder is evenly distributed within the fiber composition, not only as a result of the increase in external pressure, but also as a result of the internal pressure increase. In this case the effects of the blowing agent are developed only during the final pressing of the molded part. The sole purpose is to achieve as uniform a distribution of the binder in the fiber composition as possible.

A drawback of this method is that the binder is distributed at the same time as the high external pressure is applied which impairs the effect of the blowing agent. The blowing agent's sole function is to impart pressure upon the binders from the outside since the blowing agent in the powdered mixture only comes in contact with the external surfaces of the particles of the powdered binders and, thus, can act upon these only from the outside.

As a result of the high decomposition temperature of the blowing agent described in German Published Application No. 31 27 846, the blowing agent remains inactive during the thermal opening (steaming) of the matting and thus has no effect on the ductility of the matting, at least during this part of the process. However, the thermal opening of the matting is intended to improve its ductility and thus facilitate the subsequent forming which generally takes place in two stages. The ductility of the matting is a significant influencing factor in manufacturing the corresponding molded parts since increased ductility inhances the possible applications of the matting, thus reducing the cost of the appropriate pressing or molding processes. It is therefore desirable to improve this ductility. therefor the purpose of this invention is to optimize the distribution of binder within the matting by the known application of a blowing agent as additive to the binder combination in matting of fibrous material and to improve the ductility of the matting after it has been thermally conditioned by the treatment with hot steam.

DESCRIPTION OF THE DRAWING

FIG. I is a flow chart of the basic process which can be employed in the present invention.

SUMMARY OF THE INVENTION

Figure 1:
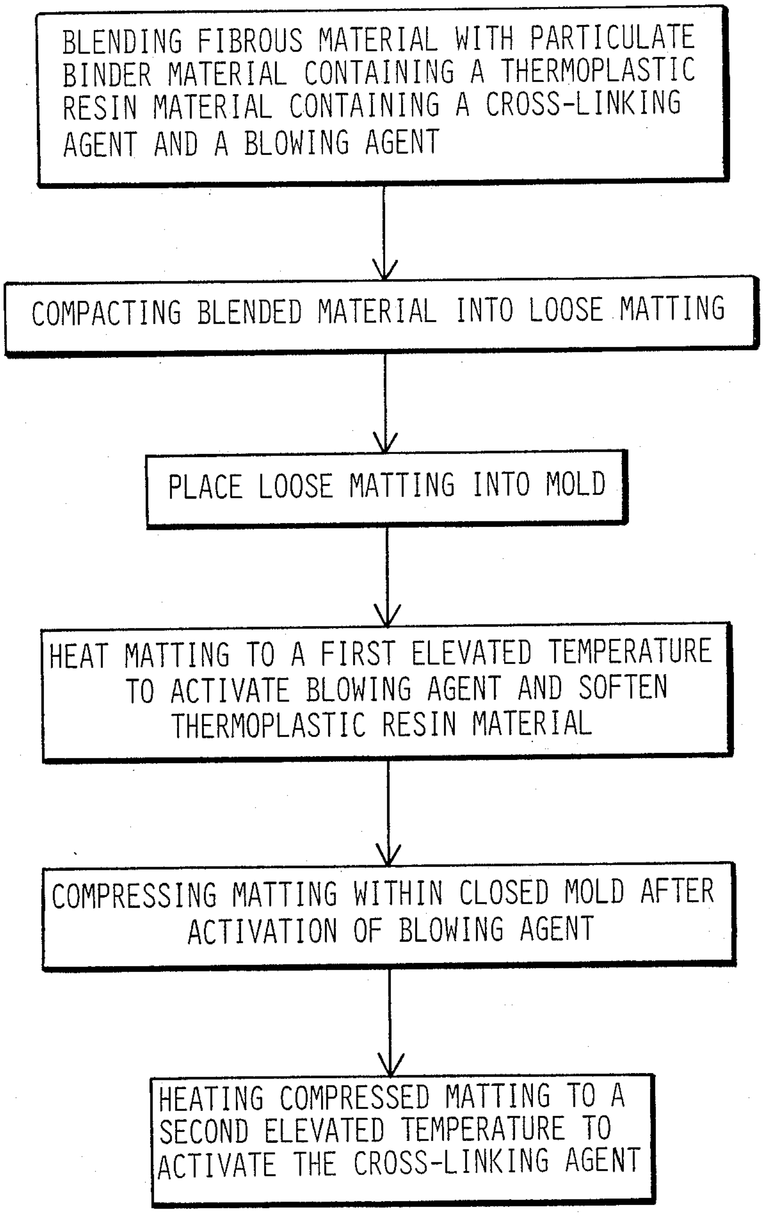

In the process of the present invention, a particulate thermoplastic binder is used into which the blowing agent is incorporated. The blowing agent and binder form an alloy-like state so that the surface of the thermoplastic binder particles are at least partially coated with at least one binder which cross-links when exposed to heat, and that the blowing agent is activated prior to the molding of the finished part.

In fiber matting for the manufacture of molded parts in accordance with this process, a particulate thermoplastic binder containing a blowing agent and coated with at least one binder which cross links when exposed to heat is incorporated in a precompacted material of poured fibrous substance.

In manufacturing the matting, the binders may be sprayed into the fibrous material in liquid form or may be strewn in the fibrous material as a powder. In either case, however, the blowing agent is incorporated into a particulate thermoplastic binder. Contrary to the state of the art, this does not represent a dry mixture of binder and blowing agent but the customary conditioning of thermoplastic substances containing blowing agents, In the present invention, the binder and blowing agent are combined in an alloy-like state. Such blowing agents containing binders are commercially available.

Use of the compound described above is advantageous in that the blowing agents do not insert an external force upon the binders, but that at least one of the binder components is expanded from within, thus increasing its surface area. This increase in the surface area results in better wetting of the matting fibers with the binder. Another advantage derives from the fact that the surfaces of the particles of the thermoplastic binder containing the blowing agent are coated with at least one binder which expands when exposed to heat. When the thermoplastic binder expands, its surface coating consisting of the binder cross-linking when exposed to heat also moves so that an additional coating of the fibers with these binders takes place by way of a wiping action. Furthermore, the binder that cross-links when exposed to heat deposited on the surface of the thermoplastic binder containing the blowing agent cannot be absorbed by the fibers and can be bound inside these fibers during the preparation of the matting. In traditional fiber matting, a part of this binder is lost for the production of a fiber composition because of an adhesion of the fiber surface areas.

Activation of the blowing agent at a temperature as low as the hot steam treatment, that is, approximately 100° C., which occurs in the process of the present invention offers two additional advantages. First, the binder distribution within the fiber composite of the matting resulting from the expansion of the particles of the thermoplastic binder containing the blowing agent occurs without external counter pressure and, thus, in a very effective manner. Second, the particles of the thermoplastic binder which expand as a result of the actions of the blowing agent form additional adhesion points for the fiber material resulting in the formation of a spacial network. This improves the forming properties or ductility of the steamed fiber matting so that either more complicated forms can be produced with the same expenditure than was possible heretofore, or that the necessary equipment can be reduced with a prespecified form.

In one advantageous embodiment of the fiber matting according to this invention, the particles of the thermoplastic binder containing the blowing agent are totally or approximately spherical. In this form, the thermoplastic binder with the incorporated blowing agent can be easily produced and can, therefore, also be obtained as semifinished goods. Furthermore, the spherical form facilitates easy incorporation of the binder in the matting by way of scattering or other methods.

The particles of the thermoplastic binders containing blowing agents may, however, also have an elongated, thread-like form. In this case the manufacture of the particles is more complicated than that of the spherical form and incorporation of the particles in the fiber matting requires increased technical expenditure. On the other hand, however, the formation of a distinct bonding network in the matting during the particle expansion is promoted, thereby imparting greatly improved ductility or molding properties to the matting. Thus, this form of the binder particles is particularly advantageous in all those cases in which extremely high ductility is demanded of the matting.

The molding properties or ductility of the fiber matting and also the mechanical properties of the finished molded part can be further enhanced by the fact that the binders which cross-link when exposed to heat and with which the particles of the thermoplastic binder are partially or completely coated consist of elastomeric materials, such as acrylonitrile-butadiene-rubber. The rubber-like properties of this binder enhance the ductility of the steam-treated matting and impart additional elasticity of the finished part.

When technical and economic vantage points are considered, the preferred percentage of the thermoplastic binders containing the blowing agents in the overall binder quantity of the matting is between 10% and 30% by weight relative to the overall amount of the matting material.

In the present case, approximately 20% by weight is considered to be particularly advantageous. The binder properties, specifically the properties of the particulate thermoplastic binder containing the blowing agent, are better utilized if larger amounts of the binder are concentrated in the center of the matting rather than in the surface areas. As a result of this, the matting contains less of the thermoplastic binder containing blowing aents near the surfaces which come in contact with the hot molding equipment during the final molding process to prevent adherence of the matting to the hot equipment surfaces. Furthermore, if the matting is molded into a low-density part (0.5–0.8g/cm$^3$), the material has a "sandwich" structure; that is, it has a porous core and two dense cover layers. For reasons of stability and weight, this structure is particularly advantageous.

The advantages of this "sandwich" structure can be further increased by addition of closely cross-linking binders, such as melamine resins being incorporated in the peripheral layers of the matting. This further increases the stability of the peripheral layers so that the resultant molded parts have at least the same stability and lower density as the conventionally produced parts. In a particularly simple embodiment of the present invention, the fiber matting has granulated thermoplastic binder containing a blowing agent of non-expanded styrene and a grain size between 0.1 and 0.4 mm. This material with an incorporated blowing agent is commercially available as a starting product so that it may be advantageously used in the manufacture of matting. Furthermore, the blowing agent is preferably formulated in such a manner that it decomposes at approximately 100° C. and expands the styrene particles.

As already mentioned, preferred fiber matting consists of cellulose or lignocellulose fibers. A small percentage of textile fibers of synthetic or natural substances, possibly also in the form of fabric, may be added in accordance with known methods.

The described fiber matting can be manufactured most expediently by coating the surface of a particulate thermoplastic binder containing a blowing agent with at least one binder which cross-links when exposed to heat and incorporating this substance in the fibers of the matting. All of the methods representing the state of the art may be employed. For example, the thermoplastic binder containing the blowing agent may be stirred into the binder which cross-links when exposed to heat while in the liquid state and may be subsequently dried. Naturally, it is also possible to spray the binder which cross-links when exposed to heat onto the surface layers of the thermoplastic binder.

After the binder which cross-links when exposed to heat has been applied to the thermoplastic binder containing the blowing agent and has been dried, the dry, coated thermoplastic binder containing the blowing agent may be strewn into the appropriate areas of the fiber filling. However, it is also possible that the particulate thermoplastic binder containing the blowing agent can be stirred into the liquid binder which crosslinks when exposed to heat, and that the combined material can be incorporated in the predetermined areas of the fiber filling by means of spraying. This method, in particular, results in a very uniform distribution in the fiber material of the binder which cross-links when exposed to heat as well as the thermoplastic binder.

Suitable binders which cross-link when exposed to heat include all corresponding knownmaterials presently used in the production of mats, especially phenols, urea formaldehyde, resins or malamine resins. It is also possible to use wide-mesh, cross-linking materials (elastomers), such as the already mentioned acrylonitrile-butadiene, as an additive to the closely cross-linking materials (thermosetting plastics).

Suitable thermoplastic binders which contain the blowing agents include polyethylenes, polyproplylenes, polyvinyl chloride and, particularly, polystyrene.

Suitable blowing agents are all those substances which decompose at the desired temperature, liberating large quantities of gas, and which can be incorporated in the thermoplastic binder particles. An example herefore is azodicarbonamide, which is used as a blowing agent for thermoplastics in injection molding and explosion molding processes. Its decomposition temperature can be shifted into the desired temperature range by way of suitable additives.

I claim:

1. A process for the manufacture of molded parts from fibrous material comprising the steps of:
   - blending the fibrous material with a particulate binder material, the binder material being a thermoplastic resin material with a blowing agent integrally blended therein and, the thermoplastic binder coated with at least one heat-activated cross-linking agent;
   - the blended fibrous material and binder material into a loose matting;
   - placing the loose matting into a mold;
   - heating the emitting to a first elevated temperature to activate the blowing agent and soften the thermoplastic material, the first elevated temperature being below that sufficient to initiate cross-linking of the heat-activated cross-linked agent;
   - compressing the matting within the closed mold after activating the blowing agent; and, then
   - heating the matting compressed in the mold to a second elevated temperature, the second elevated temperature sufficiently high to permit activation of the heat-activated cross-linking agent.

2. The process of claim 1 wherein the binder material is a homogeneous mixture of the thermoplastic binder and the blowing agent incorporated in particulate form, the particles being coated with at least one heat activated cross-linking agent.

3. The process of claim 2 wherein the first elevated temperature is achieved by exposing the matting to hot steam.

4. The process of claim 1 wherein cellulose-containing fibers are used as the fibrous material.

5. The process of claim 1 further comprising the steps of:
   - spraying said particulate thermoplastic material into which a blowing agent has been integrally blended with a liquid heat-activated cross-linking agent; and
   - drying the resulting particles prior to addition of the particles to the fibrous material.

6. The process of claim 5 wherein the thermoplastic resin binder material is incorporated in the fibrous material in a dry state.

7. The process of claim 1 wherein the thermoplastic resin binder is present as particles and is sprayed with the heat-activated cross-linking agent in liquid form in order to coat the former, and the mixture is subsequently incorporated in the fibrous material of the matting by spraying the particles therein.

8. The process of claim 1 wherein the concentration of the particulate thermoplastic binder containing the blowing agent and coated with at least one binder which cross-links when exposed to heat incorporated in the fiber matting varies with respect to the thickness of the fiber matting such that the concentration is less at the surface areas of the fiber matting than in its center.

9. The process of claim 8 further comprising the step of introducing an additional amount of cross-linking agent into the outer surface area of the fiber matting.

10. The process of claim 9 wherein the heat-activated cross-linking agents consist of substances with varying cross-linking characteristics.

11. The process of claim 1 wherein between about 10 and about 30 percent by weight binder material based on the overall weight of the matting are blended with the fibrous material.

12. A fiber matting for the manufacture of molded parts according to the process of claim 1 wherein a particulate thermoplastic binder containing a blowing agent and coated with at least one heat-activated cross-linking is incorporated in fibrous material after the fibrous material is computed.

13. The fiber matting of claim 12 wherein the thermoplastic binder particles are spherical.

14. The fiber matting of claim 12 wherein the thermoplastic binder particles have an elongated, particularly a thread-like, form.

15. The fiber matting of claim 12 wherein the heat-activated cross-linking agent contains elastomeric substances such as acrylonitrile-butadiene.

16. The fiber matting of claim 12 wherein the thermoplastic binder containing a blowing agent consists essentially of non-expanded polystyrene particles having a grain size between 0.1 and 1.0 mm.

17. The fiber matting of claim 13 wherein the fibrous material is selected from the group consisting of cellulose-containing fibers, synthetic textile fibers, natural textile fibers or mixtures thereof.

* * * * *